United States Patent
Taniguchi et al.

(10) Patent No.: US 7,233,613 B2
(45) Date of Patent: Jun. 19, 2007

(54) SYNCHRONIZATION ESTABLISHING DEVICE, METHOD OF ESTABLISHING SYNCHRONIZATION, AND RECEIVER

(75) Inventors: Shoji Taniguchi, Kawasaki (JP); Koichi Kuroiwa, Kawasaki (JP); Masami Kanasugi, Kawasaki (JP); Mahiro Hikita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/789,863

(22) Filed: Feb. 21, 2001

(65) Prior Publication Data
US 2001/0046257 A1 Nov. 29, 2001

(30) Foreign Application Priority Data
Apr. 28, 2000 (JP) ............................. 2000-131440

(51) Int. Cl.
*H04B 1/00* (2006.01)
(52) U.S. Cl. ..................... 375/142; 375/145; 375/149
(58) Field of Classification Search ................ 375/355, 375/142–143, 150, 130, 134, 136, 147, 148, 375/152, 137, 144, 145, 149; 370/320, 385, 370/342, 441, 335
See application file for complete search history.

(56) References Cited

U.S. PATENT DOCUMENTS

| 5,305,349 | A | * | 4/1994 | Dent | 370/209 |
|---|---|---|---|---|---|
| 5,373,531 | A | * | 12/1994 | Kawasaki | 375/150 |
| 5,638,362 | A | * | 6/1997 | Dohi et al. | 370/342 |
| 5,719,900 | A | * | 2/1998 | Dixon et al. | 375/200 |
| 5,764,690 | A | * | 6/1998 | Blanchard et al. | 375/206 |
| 5,774,494 | A | * | 6/1998 | Sawahashi et al. | 375/207 |
| 5,784,403 | A | * | 7/1998 | Scott | 375/207 |
| 5,818,866 | A | * | 10/1998 | Wilk | 375/149 |
| 5,859,842 | A | * | 1/1999 | Scott | 370/342 |
| 5,903,595 | A | * | 5/1999 | Suzuki | 375/207 |
| 5,933,464 | A | * | 8/1999 | Zogg | 375/343 |
| 6,011,787 | A | * | 1/2000 | Nakano et al. | 370/335 |
| 6,028,887 | A | * | 2/2000 | Harrison et al. | 375/147 |
| 6,038,450 | A | * | 3/2000 | Brink et al. | 455/442 |
| 6,064,695 | A | * | 5/2000 | Raphaeli | 375/230 |
| 6,067,314 | A | * | 5/2000 | Azuma | 375/147 |

(Continued)

FOREIGN PATENT DOCUMENTS

EP 0 825 737 2/1998

(Continued)

OTHER PUBLICATIONS

Gweon-Do Jo, et al., "A Compact Matched Filter for Rapid Code Acquisition" Vehicular Technology Conference, Sep. 1999 pp. 713-717, XP010353091 : ISBN: 0-7803-5435-4.

(Continued)

*Primary Examiner*—Emmanuel Bayard
(74) *Attorney, Agent, or Firm*—Katten Muchin Rosenman LLP

(57) ABSTRACT

The present invention provides a synchronization establishing device and method for establishing synchronization at a high speed in a receiver. This synchronization establishing device includes a storage unit that accumulates reception data, and a matched filter that reads out the reception data accumulated in the storage unit in parallel and determines a correlation value by obtaining correlation between a common code and the reception data in parallel.

14 Claims, 14 Drawing Sheets

U.S. PATENT DOCUMENTS

| | | |
|---|---|---|
| 6,169,771 B1 | 1/2001 | Shou et al. |
| 6,243,397 B1 * | 6/2001 | Yun .......................... 370/480 |
| 6,363,060 B1 * | 3/2002 | Sarkar ....................... 370/342 |
| 6,370,130 B1 * | 4/2002 | Zhou et al. ................. 370/335 |
| 6,373,881 B1 * | 4/2002 | Mizuguchi et al. ......... 375/147 |
| 6,377,613 B1 * | 4/2002 | Kawabe et al. ............. 375/142 |
| 6,385,232 B1 | 5/2002 | Terashima |
| 6,424,641 B1 * | 7/2002 | Kotov ........................ 370/342 |
| 6,490,316 B1 * | 12/2002 | Motegi et al. .............. 375/150 |
| 6,570,865 B2 * | 5/2003 | Masui et al. ................ 370/342 |
| 6,665,332 B1 * | 12/2003 | Carlson et al. ............. 375/130 |
| 6,678,313 B1 * | 1/2004 | Imaizumi et al. .......... 375/150 |
| 6,707,844 B1 * | 3/2004 | Imaizumi et al. .......... 375/148 |
| 2001/0004378 A1 * | 6/2001 | Takeuchi et al. ........... 375/148 |
| 2002/0036588 A1 * | 3/2002 | Gronemeyer ............... 342/378 |
| 2003/0128740 A1 * | 7/2003 | Iwamoto et al. ........... 375/130 |

FOREIGN PATENT DOCUMENTS

| | | |
|---|---|---|
| EP | 0 838 910 | 4/1998 |
| EP | 0 855 796 | 7/1998 |
| EP | 0 944 178 | 9/1999 |
| JP | 8-032547 | 2/1996 |
| JP | 9-098110 | 4/1997 |
| JP | 10-126380 | 5/1998 |
| JP | 10-210005 | 8/1998 |
| JP | 10210004 | 8/1998 |
| JP | 11-266181 | 9/1999 |
| WO | WO 97/33400 | 9/1997 |
| WO | WO97/33400 | 9/1997 |
| WO | WO 98/02973 | 1/1998 |
| WO | WO 98/02975 | 1/1998 |

OTHER PUBLICATIONS

Notice of Grounds for Rejection dated Jul. 26, 2005 with translation.

Gweon-Do Jo et al. "A Compact Matched Filter for Rapid Code Acquisition" Vehicular Technology Conference, Sep. 22, 1999, VTC 1999-Fall.

Japanese Office Action dated Oct. 11, 2005 with translation.

* cited by examiner

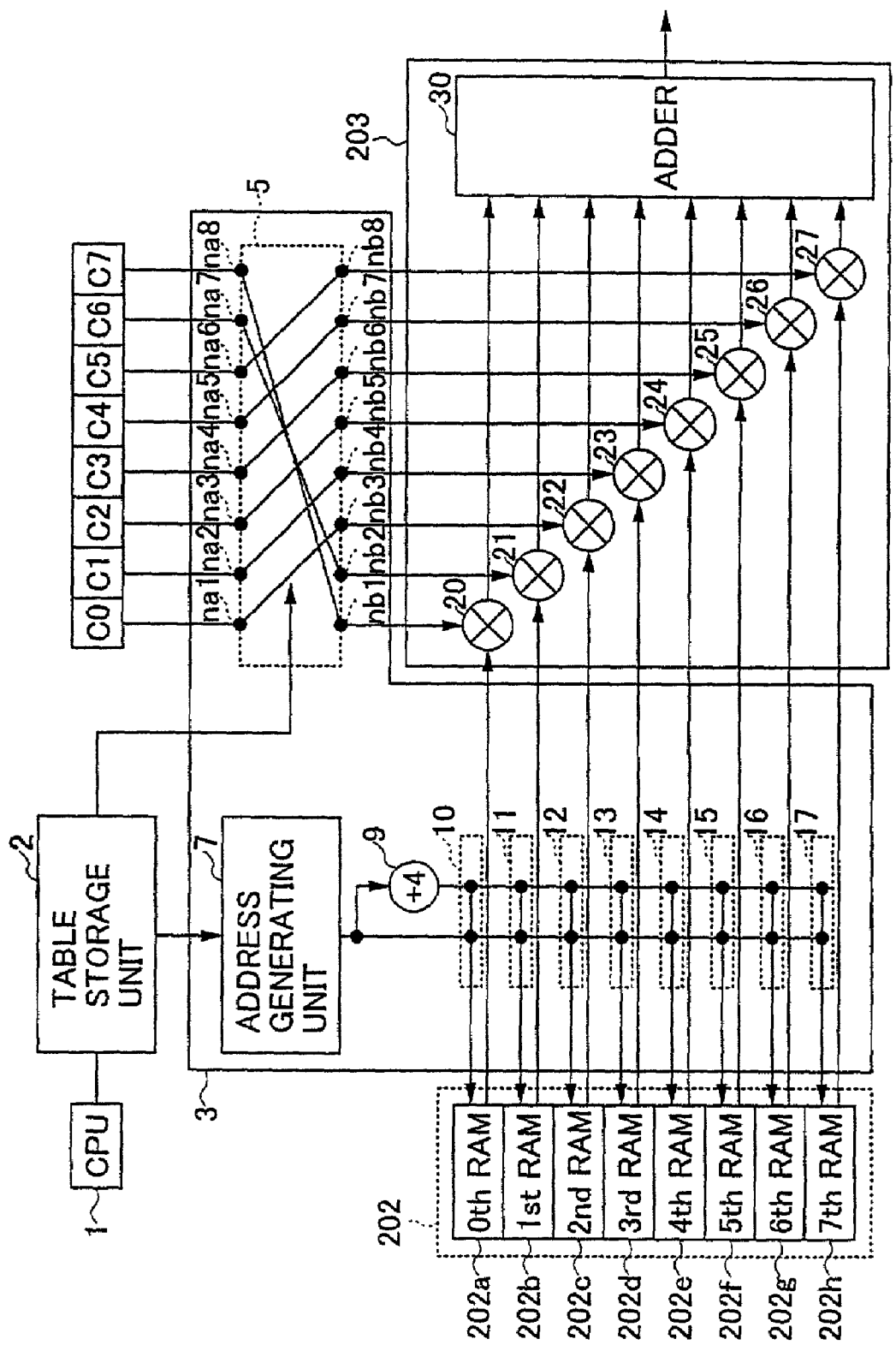

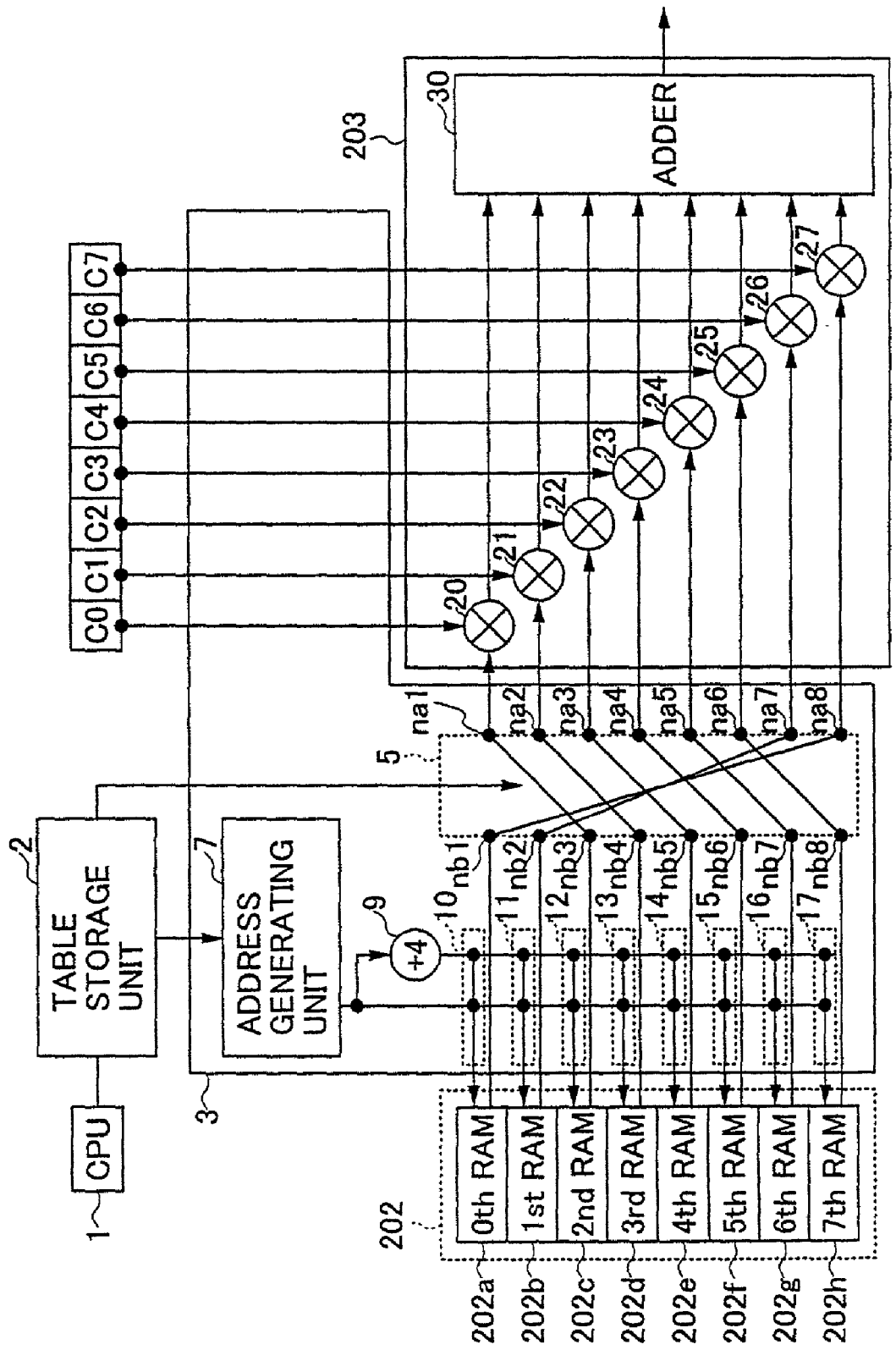

SYNCHRONIZATION ESTABLISHING DEVICE, METHOD OF ESTABLISHING SYNCHRONIZATION, AND RECEIVER

BACKGROUND OF THE INVENTION

1. Field of the Invention

The present invention relates to a synchronization establishing device that establishes synchronization in a receiver, and a method of establishing synchronization. The present invention also relates to the receiver.

2. Description of the Related Art

In a receiver that employs a CDMA (Code Division Multiple Access) system, the top of a slot (one group of data) contained in a reception signal is searched for by detecting the strength of a synchronization signal. This is called "cell search". A pattern contained in the slot is then detected to search for the top of a frame made up of 15 slots. This is called "second code search". The reception signal, of which cycles have been roughly grasped through the above searches, is more precisely detected so as to maintain synchronization. This is called "path search". Thus, the data contained in the reception signal can be received.

In the second code search, a spreading code is conventionally used. An example of such a spreading code is shown in FIG. 1. As shown in FIG. 1, the spreading code is an (N×M)-bit spreading code generated by multiplying a common code Z that comprises N codes a(0) to a(N−1) by an intrinsic code that comprises M code bn(0) to bn (M−1) (a bit string). The N code will be also referred to as "N chips", and the M code will be also referred to as "M chips". The (N×M)-bit spreading code will be referred to as "(N×M) chips".

FIG. 2 shows the structure of a conventional synchronization establishing device used in the second code search. As shown in FIG. 2, this synchronization establishing device comprises a random access memory (RAM) 101, a correlator 102 for correlating a common code, and correlators 103a to 103d for correlating intrinsic codes. The correlator 102 is connected to the RAM 101, and the correlators 103a to 103d are connected to the correlator 102 in parallel with each other.

In the synchronization establishing device having the above structure, the RAM 101 temporarily stores a reception signal, and the correlator 102 reverse-diffuses common code parts in the reception signal supplied from the RAM 101 in accordance with a supplied common code. The correlator 103a reverse-diffuses the reception signal supplied from the correlator 102 in accordance with an intrinsic code 0, thereby generating a code-0 correlation value. Likewise, the correlators 103b to 103d each reverse-diffuse the reception signal supplied from the correlator 102 in accordance with one of intrinsic codes 1 to n, thereby generating the correlation value of each of the codes 1 to n.

FIGS. 3A and 3B illustrate the operation performed by the conventional synchronization establishing device shown in FIG. 2. As shown in FIG. 3A, the correlator 102 for the common code carries out despreading (integration) in the N process cycles at the timing indicated by the arrows, in accordance with the common code made up of the N chips. As shown in FIG. 3B, the correlators 103a to 103d for intrinsic codes carry out integration M times at the timing shown by the arrows, in accordance with the intrinsic code made up of the M chips. Accordingly, the conventional synchronization establishing device requires the N×M process cycles for the despreading process through the second code search. As for a receiver employing a CDMA system, however, there is a demand for high-speed synchronization establishment through the detection of code phases of reception signals.

SUMMARY OF THE INVENTION

A general object of the present invention is to provide synchronization establishing devices in which the above disadvantages are eliminated.

A more specific object of the present invention is to provide a synchronization establishing device that can promptly establish synchronization in a receiver, and a method of establishing synchronization. Another specific object of the present invention is to provide the receiver.

The above objects of the present invention are achieved by a synchronization establishing device that establishes synchronization in a receiver. This synchronization establishing device includes: a data storage unit that accumulates reception data; and a correlation value detection unit that reads out the reception data accumulated in the data storage unit in parallel, and determines a correlation value by establishing correlation with a predetermined code in parallel.

The above objects of the present invention are also achieved by a synchronization establishing method that includes the steps of: accumulating reception data; reading out the accumulated reception data in parallel; and determining a correlation value by establishing correlation with a predetermined code and the reception data in parallel.

With this synchronization establishing device, the detection of a correlation value can be carried out at a high speed, because the correlation between the reception data and the predetermined code is maintained in parallel.

With a receiver employing the above synchronization establishing method, high-speed synchronization establishment can be realized in the receiver.

The above and other objects and features of the present invention will become more apparent from the following description taken in conjunction with the accompanying drawings.

BRIEF DESCRIPTION OF THE DRAWINGS

FIG. 13 illustrates the data read-out operation shown in FIG. 12 performed by the read-out control unit shown in FIG. 8; and FIG. 14 illustrates the data read-out operation shown in FIG. 12 performed by the read-out control unit shown in FIG. 9.

DESCRIPTION OF THE PREFERRED EMBODIMENTS

Figure 1:
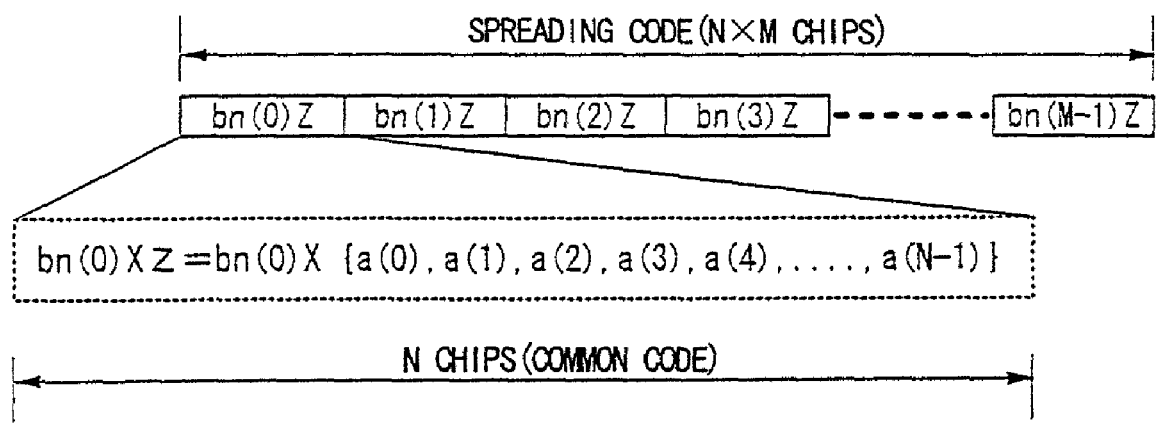
FIG. 1 shows an example of a conventional spreading code.
Figure 2:
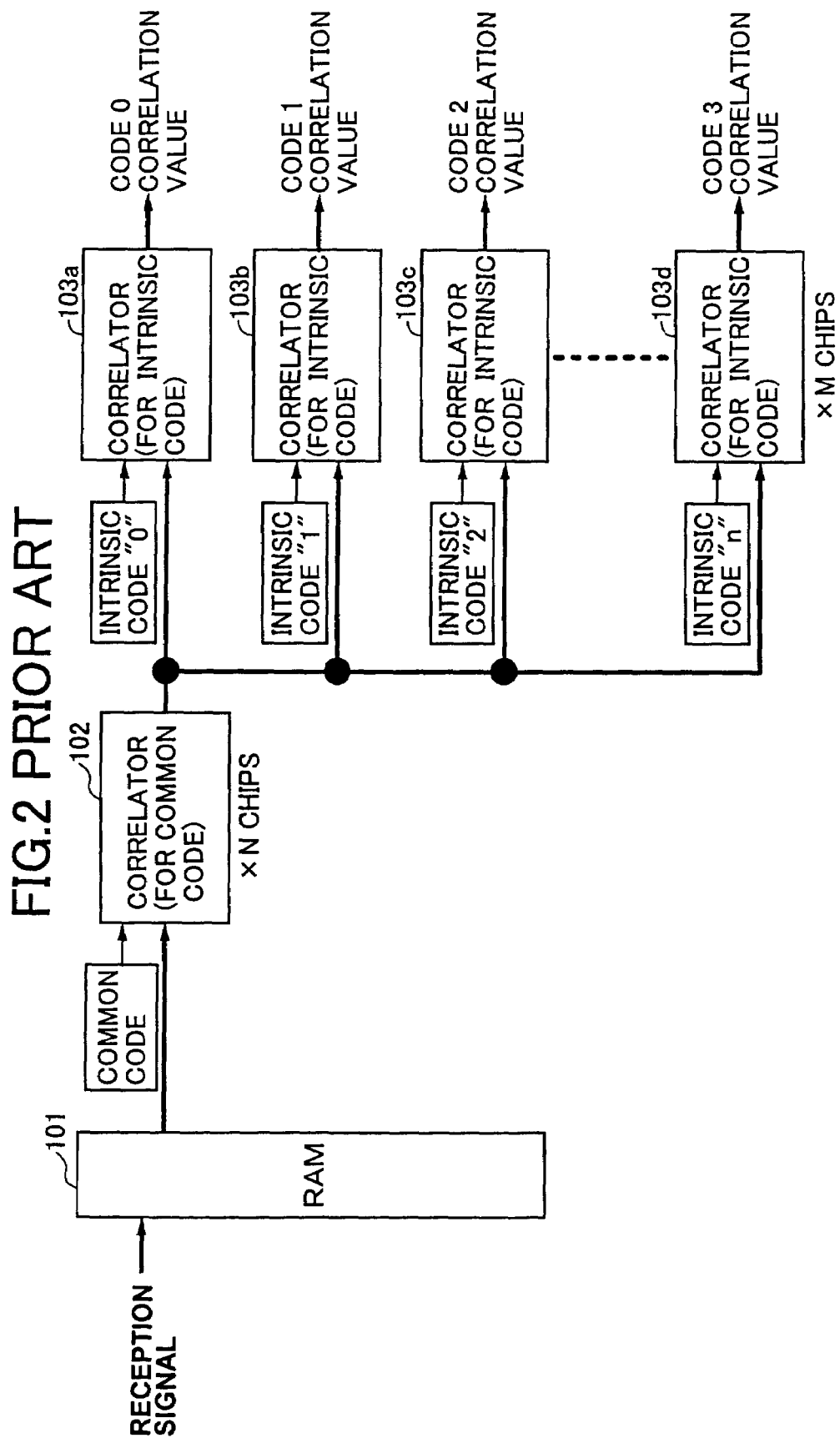
FIG. 2 shows the structure of a conventional synchronization establishing device used in a second code search process.

The following is a description of embodiments of the present invention, with reference to the accompanying drawings. Throughout the drawings, like reference numerals indicate like components or parts.

Figure 4:
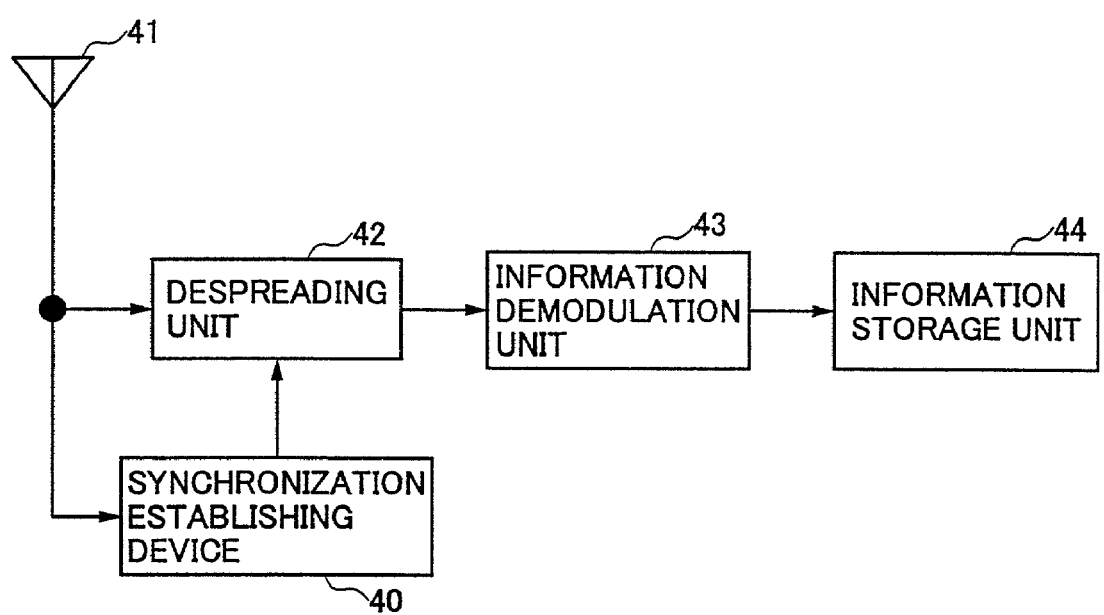
FIG. 4 shows the basic structure of a receiver in accordance with the present invention.

FIG. 4 shows the basic structure of a receiver in accordance with one embodiment of the present invention. As shown in FIG. 4, the receiver of the present invention comprises a synchronization establishing device 40, an antenna 41, a despreading unit 42, an information demodulation unit 43, and an information storage unit 44. The synchronization establishing device 40 and the despreading unit 42 are connected to the antenna 41. The despreading unit 42 is also connected to the synchronization establishing device 40. The information demodulation unit 43 is connected to the despreading unit 42, and the information storage unit 44 is connected to the information demodulation unit 43.

In the above structure, the synchronization establishing device 40 has a function of matching the timing of a code to be generated on the receiver side to the timing of a receiving signal received by the antenna 41 based on a supplied correlation value. The despreading unit 42 uses the codes synchronized by the synchronization establishing device 40, so as to extract an information modulation wave from the reception signal. The information demodulation unit 43 demodulates the information modulation wave supplied from the despreading unit 42. The information demodulated by the information demodulation unit 43 is stored in the information storage unit 44.

Figure 5:
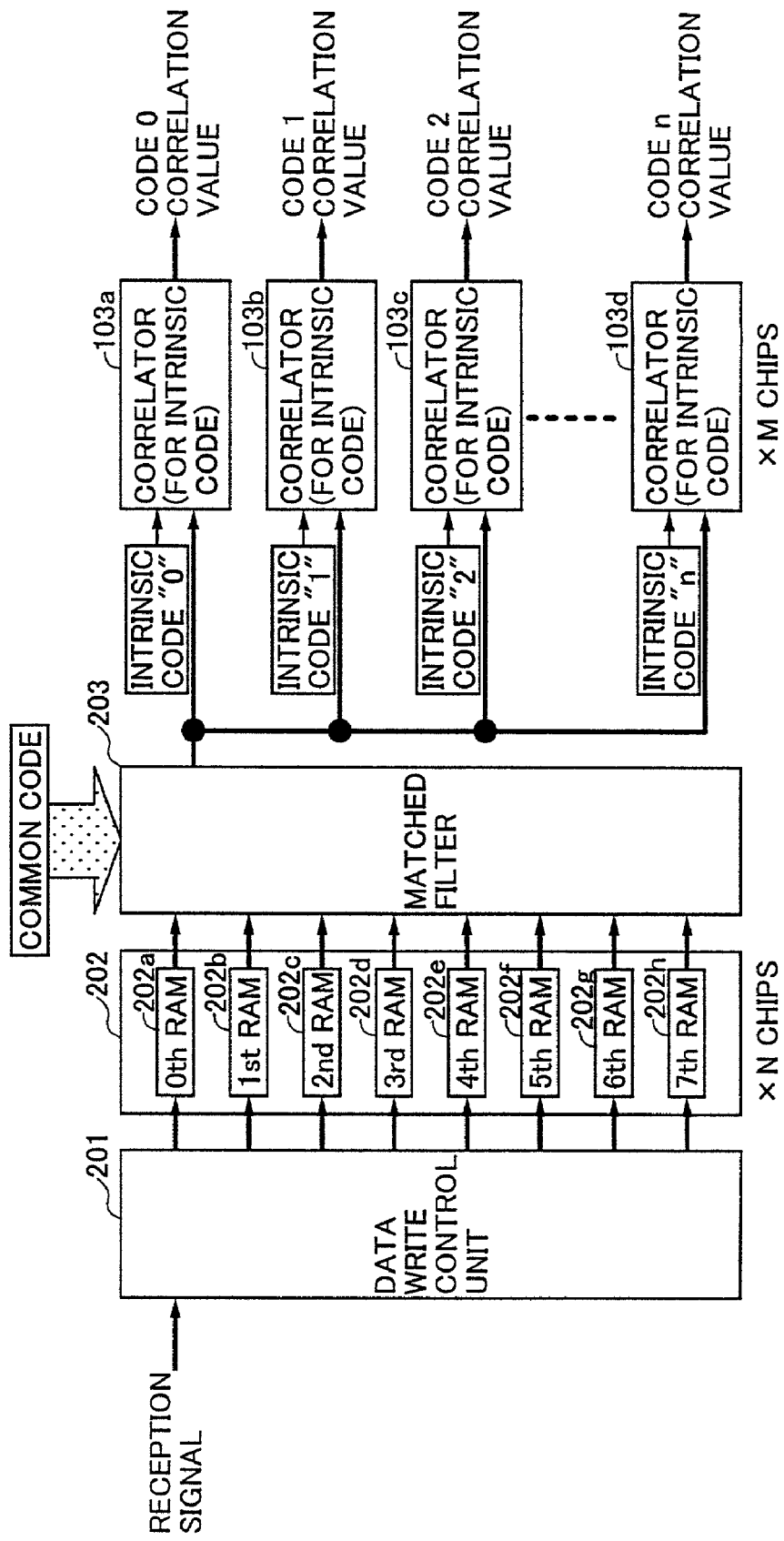
FIG. 5 shows the basic structure of a synchronization establishing device shown in FIG. 4.

FIG. 5 shows the basic structure of the synchronization establishing device 40 shown in FIG. 4. As shown in FIG. 5, the synchronization establishing device 40 comprises a data write control unit 201, a memory unit 202, a matched filter 203, and correlators 103a to 103d for correlating intrinsic codes. The memory unit 202 includes a plurality of RAMs 202a to 202h. For example, the memory unit 202 includes eight RAMs, which are a 0th RAM corresponding to the RAM 202a to a 7th RAM corresponding to the RAM 202h. In this case, the matched filter 203 is an 8-tap matched filter.

The memory unit 202 is connected to the data write control unit 201, while the matched filter 203 is connected to the memory unit 202. The correlators 103a to 103d are connected to the matched filter 203.

Figure 6:
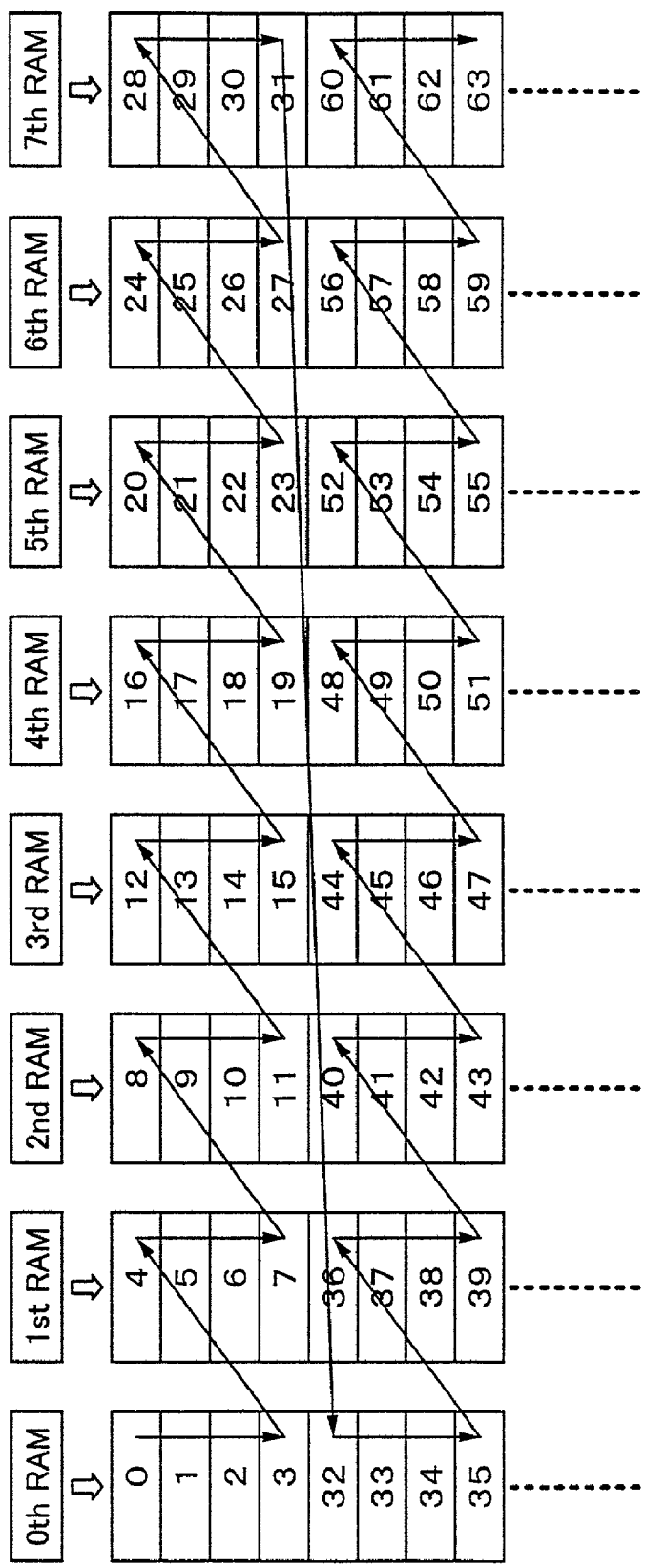
FIG. 6 shows a data write operation performed by the synchronization establishing device shown in FIG. 5.
Figure 7:
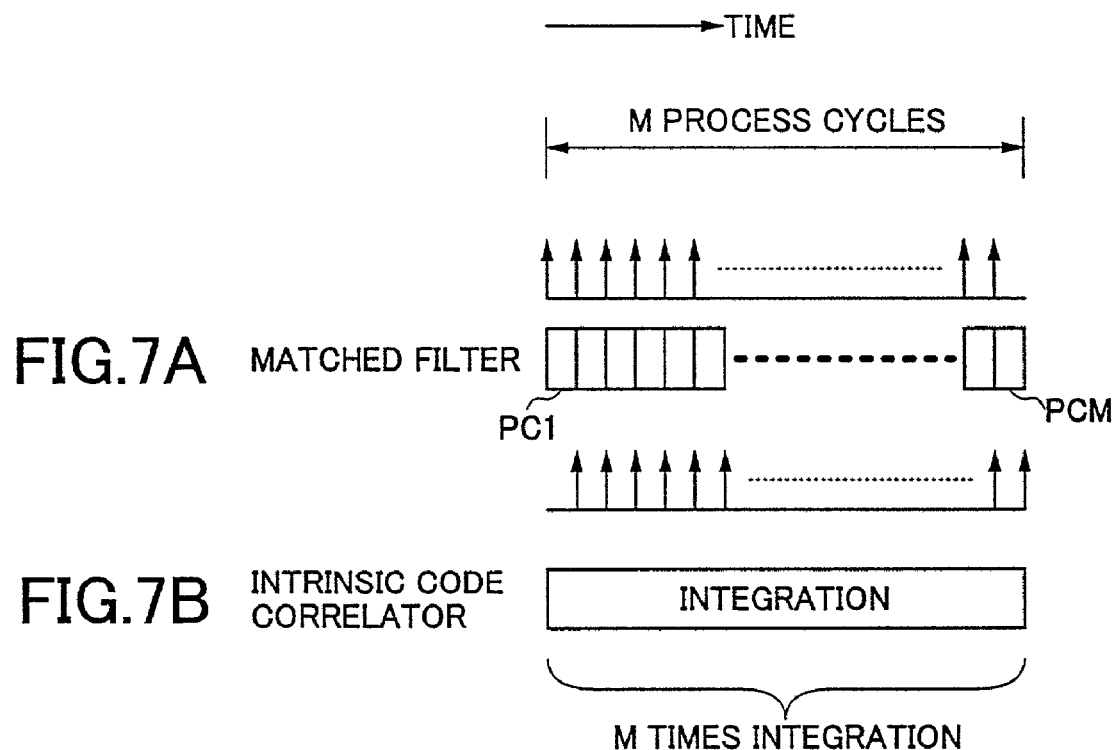
FIGS. 7A and 7B are timing charts illustrating an operation performed by the synchronization establishing device shown in FIG. 5.

Referring now to FIGS. 6 and 7, an operation of the synchronization establishing device 40 will be described below. In FIG. 6, sampling data sampled from the reception signal is denoted by sampling numbers that indicate the sampling order, and is stored in the memory unit 202 by four "over-samplings", for instance. The "over-samplings" refer to repetitive sampling operations performed on the same data, and the number of repetitive sampling operations performed on the same data is the number of over-samplings.

The data write control unit 201 shown in FIG. 5 performs four over-samplings on a supplied reception signal. As shown in FIG. 6, the sampled data is sequentially stored in the RAMs in accordance with the number of over-samplings. More specifically, the 0th sampling data to the 3rd sampling data are sequentially stored in the 0th RAM 202a, as indicated by an arrow in FIG. 6. The 4th sampling data to the 7th sampling data are sequentially stored in the 1st RAM 202b. Likewise, each four sampling data are sequentially stored in each corresponding RAM. After the 28th sampling data to the 31st sampling data are stored in the 7th RAM 202h, the 32nd sampling data to the 35th sampling data are stored in the 0th RAM 202a.

As shown in FIG. 7, the matched filter 203 carries out a first common process cycle PC1. In the common process cycle, as will be described later in detail, eight sampling data corresponding to a common code made up of eight chips are read out in parallel from the eight RAMs, i.e., the 0th RAM 202a to the 7th RAM 202h, to the matched filter 203, so that the correlation with the common code supplied to the matched filter 203 is obtained. Further, the correlation values obtained are added up and supplied to the correlators 103a to 103d. The matched filter 203 then repeats the common process, in which the correlation with the common code is maintained, until the Mth common process cycle PCM at the timing indicated by the arrows shown in FIG. 7A.

Meanwhile, the correlators 103a to 103d for intrinsic codes, which acquire correlation with the intrinsic code, carry out integration M times at the timing indicated by the arrows shown in FIG. 7B. By doing so, a code-0 correlation value is outputted from the correlator 103a, which has correlation with an intrinsic code 0. Likewise, a code-n correlation value is outputted from the correlator 103d, which has correlation with an intrinsic code n.

Figure 3:
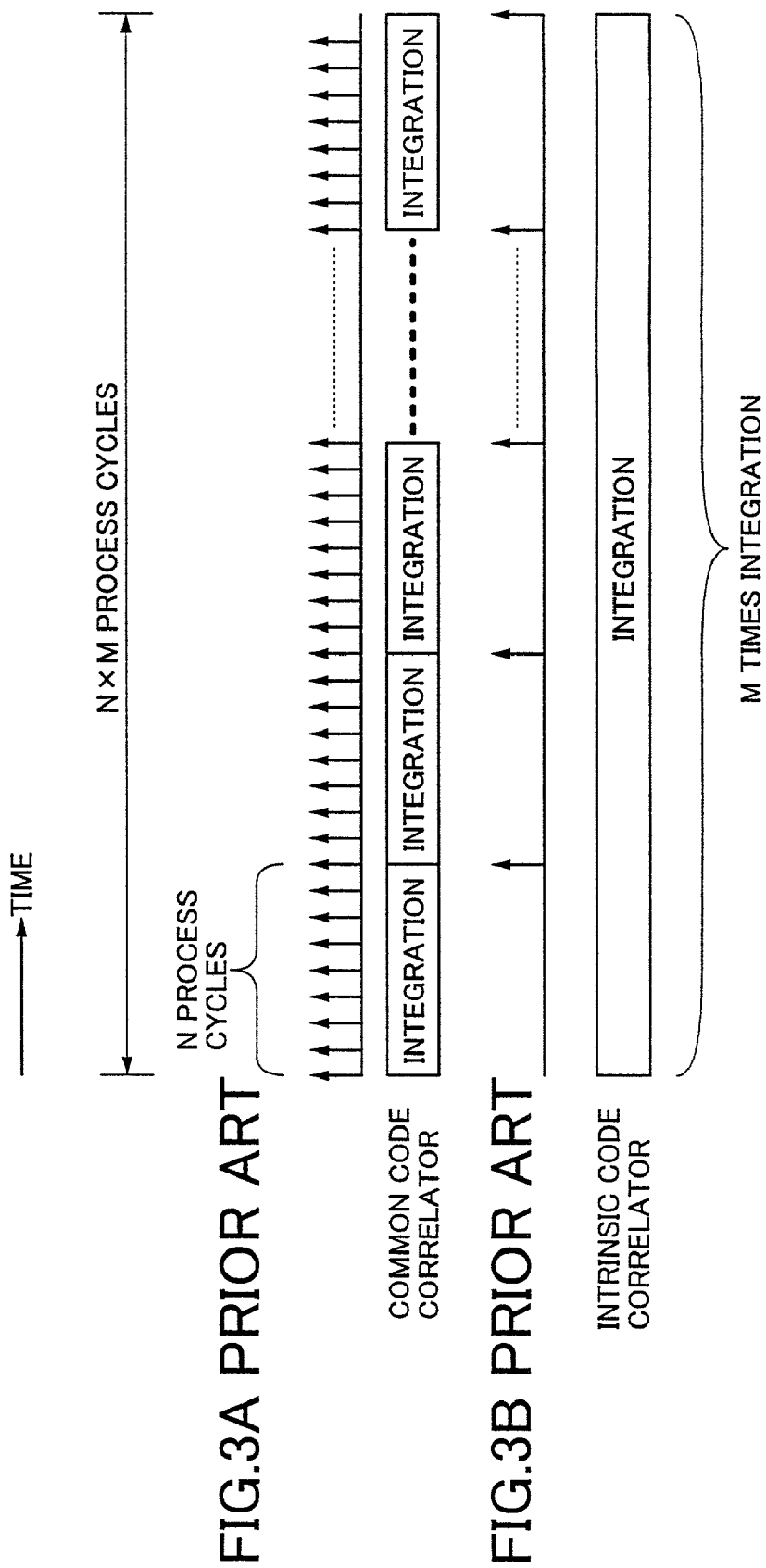
FIGS. 3A and 3B are timing charts illustrating an operation performed by the synchronization establishing device shown in FIG. 2.

As described above, in the synchronization establishing device 40 of this embodiment, the matched filter 203 maintains correlation between the chips a(0) to a(N−1) and reception signals, thereby obtaining correlation values with spreading codes in the M-process cycles shown in FIG. 7A. When detecting correlation values with the same spreading code, the conventional synchronization establishing device requires the N×M process cycles, as shown in FIGS. 3A and 3B. By the synchronization establishing device 40 of this embodiment, on the other hand, the process time for detecting the correlation values can be reduced to 1/N of the N×M process cycles. Thus, synchronization can be established in a receiver of a CDMA system at a higher speed.

Figure 8:
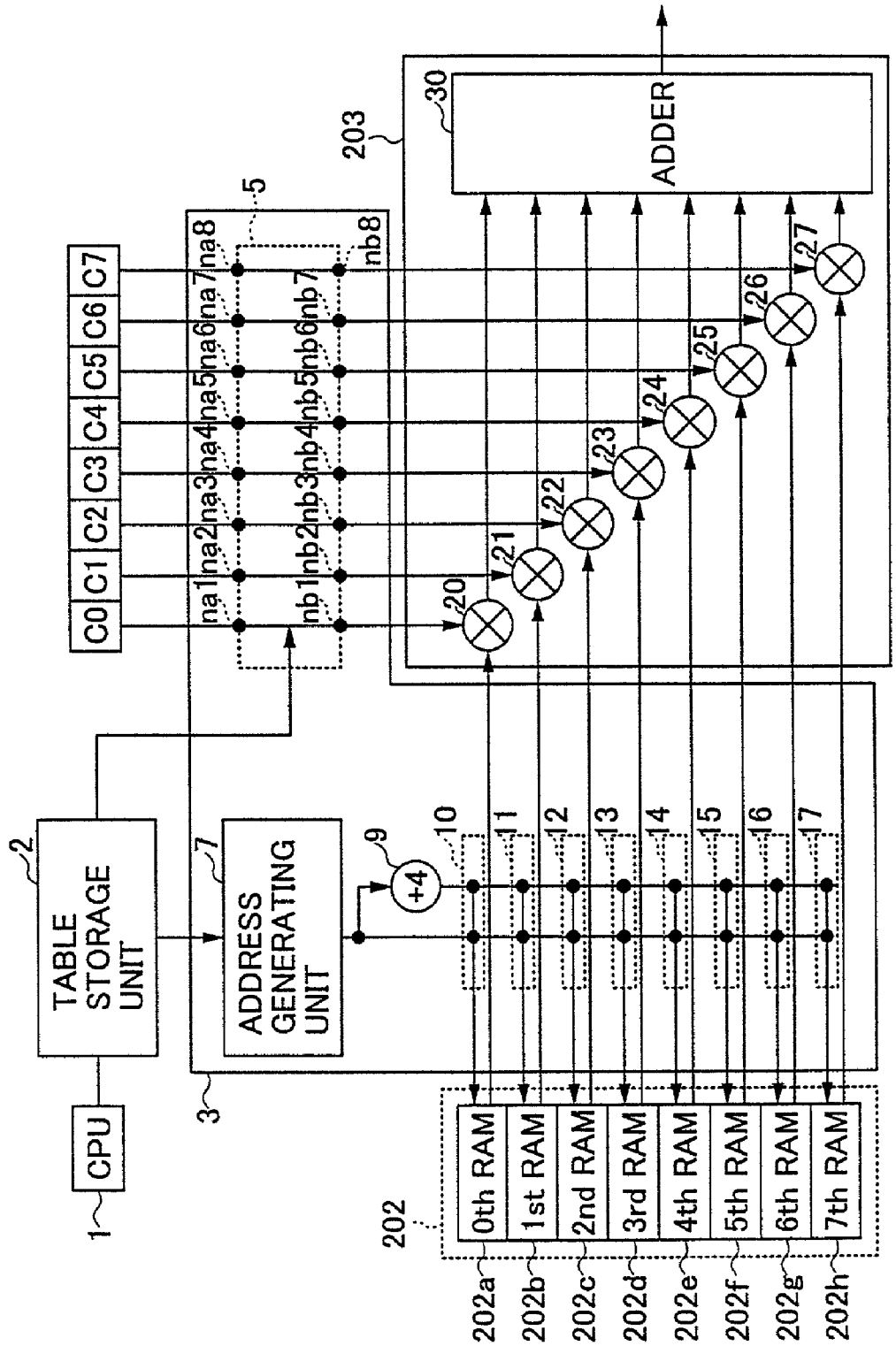
FIG. 8 shows a first example of a read-out control unit in accordance with the present invention.

FIG. 8 shows a first example of the structure of a read-out control unit in the synchronization establishing device 40 of this embodiment. As shown in FIG. 8, the read-out control unit 3 is interposed between the memory unit 202 and the matched filter 203 shown in FIG. 5. The read-out control unit 3 comprises a barrel shifter 5, an address generating unit 7, an added address generating unit 9, and address supply units 10 to 17.

The barrel shifter 5 and the address generating unit 7 are connected to a table storage unit 2 connected to a CPU 1. The added address generating unit 9 is connected to the address generating unit 7, and sequentially adds 4×K (K is a natural number) to a supplied address generating initial value, thereby generating an address. The address supply units 10 to 17 are connected to the address generating unit 7 and the added address generating unit 9. Also, the address supply units 10 to 17 are connected to the 0th RAM 202a to the 7th RAM 202h, respectively.

The matched filter 203 comprises multipliers 20 to 27 and an adder 30. The input terminals of the multipliers 20 to 27 are connected to the barrel shifter 5 and the memory unit 202, while the output terminals of the multipliers 20 to 27 are connected to the adder 30. As shown in FIG. 8, each of the multipliers 20 to 27 is connected to each corresponding RAM. For instance, one input terminal of the multiplier 20 is connected to the 0th RAM 202a, and one input terminal of the multiplier 21 is connected to the 1st RAM 202b. The adder 30 is connected to the correlators 103a to 103d shown in FIG. 5.

In the following, a sampling data read-out operation performed by the synchronization establishing device 40 of this embodiment will be described. When the despreading is performed on sampling data stored in the memory unit 202, the starting position is specified by the CPU 1. The following Table 1 is stored in the table storage unit 2 in advance.

TABLE 1

| STARTING POSITION NUMBER | SHIFT | OFFSET LOCATION | ADDRESS GENERATING INITIAL VALUE |
|---|---|---|---|
| 0 | 0 | NONE | 0 |
| 1 | 0 | NONE | 1 |
| 2 | 0 | NONE | 2 |
| 3 | 0 | NONE | 3 |
| 4 | 1 | ONLY AT 0th RAM | 0 |
| 5 | 1 | ONLY AT 0th RAM | 1 |
| 6 | 1 | ONLY AT 0th RAM | 2 |
| 7 | 1 | ONLY AT 0th RAM | 3 |
| 8 | 2 | ONLY AT 0th AND 1st RAMS | 0 |
| 9 | 2 | ONLY AT 0th AND 1st RAMS | 1 |
| 10 | 2 | ONLY AT 0th AND 1st RAMS | 2 |
| 11 | 2 | ONLY AT 0th AND 1st RAMS | 3 |
| 12 | 3 | ONLY AT 0th, 1st, AND 2nd RANS | 0 |
| . | . | . | . |
| . | . | . | . |
| . | . | . | . |

In Table 1, the "start position number" indicates the sampling number of sampling data to start the despreading, and the "shift amount" indicates the amount of shift from the 0th RAM 202a when a RAM is selected for initially reading out the sampling data. The "offset location" indicates a RAM to which an address generated by the added address generating unit 9 should be supplied as an initial value. The "address generating initial value" indicates an address to be supplied to each RAM via the address generating unit 7 as an initial address in the read-out of sampling data. An "address" is a number allotted to the sampling data stored in each RAM, and starts from "0". For instance, the addresses of the sampling data having the sampling numbers 4, 5, 6, 7, 36, 37, and 38 stored in the 1st RAM 202b shown in FIG. 6 are 0, 1, 2, 3, 4, 5, and 6.

Once the starting position number is supplied from the CPU 1 to the table storage unit 2, the shift amount corresponding to the starting position number is supplied from the table storage unit 2 to the barrel shifter 5, and an address generating initial value and the offset location corresponding to the starting position number are supplied to the address generating unit 7. In the following, a case where a starting position number "0" is designated by the CPU 1 will be described, with reference to FIG. 10.

As described above, "0" is supplied as a shift amount from the table storage unit 2 to the barrel shifter 5. In this case, a node na1 is connected to a node nb1, and a node na2 is connected to a node nb2. Likewise, the rest of the nodes na3 to na8 are connected to nodes nb3 to nb8, as shown in FIG. 8. Chips C0 to C7 that constitute the common code are supplied to the nodes na1 to na8, respectively.

Figure 10:
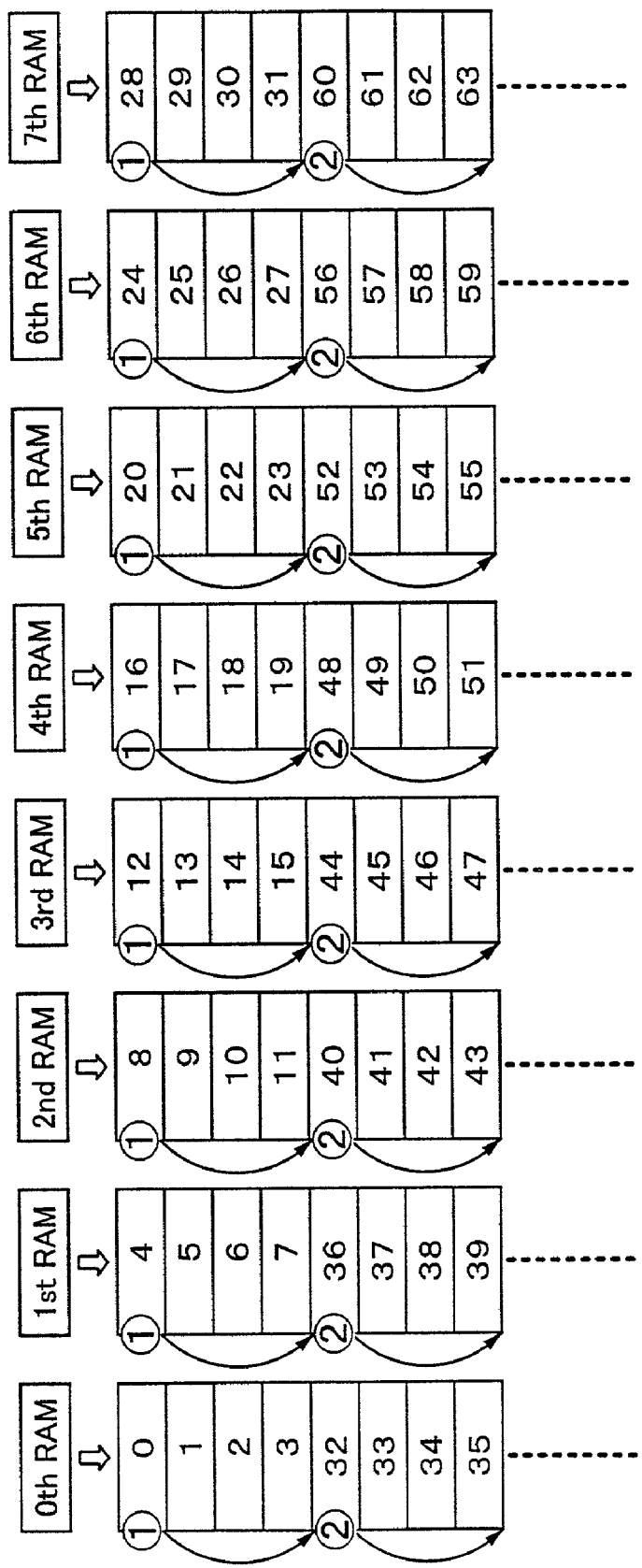
FIG. 10 illustrates an example of a data read-out operation performed by the read-out control unit shown in FIG. 8 or 9.

Meanwhile, the table storage unit 2 notifies the address generating unit 7 that there is no offset location, and supplies "0" as an address generating initial value to the address generating unit 7. As a result, the address "0" is supplied to all the RAMs 202a to 202h. As shown in FIG. 10, the sampling data having the sampling number "0" is read out from the 0th RAM 202a, the sampling data having the sampling number "4" is read out from the 1st RAM 202b. Likewise, the sampling data having the sampling number "28" is read out from the 7th RAM 202h, and all the sampling data are supplied to the multipliers 20 to 27 in parallel.

The address "4" generated by adding 4 to the address generating initial value in the added address generating unit 7 is supplied to each of the RAMs 202a to 202h, so that the sampling data having the sampling numbers "32", "36", "40", "44", "48", "52", "56", and "60" are read out from the RAMs 202a to 202h, respectively, for the second-time reading out. The sampling data read out from the RAMs 202a to 202h are then supplied to the multipliers 20 to 27 in parallel.

The multipliers 20 to 27 each multiply the sampling data supplied from the memory unit 202 by common codes supplied from the nodes nb1 to nb8 of the barrel shifter 5. The multiplication results are then supplied to the adder 30. For instance, the multiplier 20 multiplies the sampling data having the sampling number "0" supplied from the 0th RAM 202a by the common code supplied from the node nb1, and the multiplication result is supplied to the adder 30.

The adder 30 adds up the values supplied from the multipliers 20 to 27, and the addition result is supplied to the correlators 103a to 103d.

Figure 9:
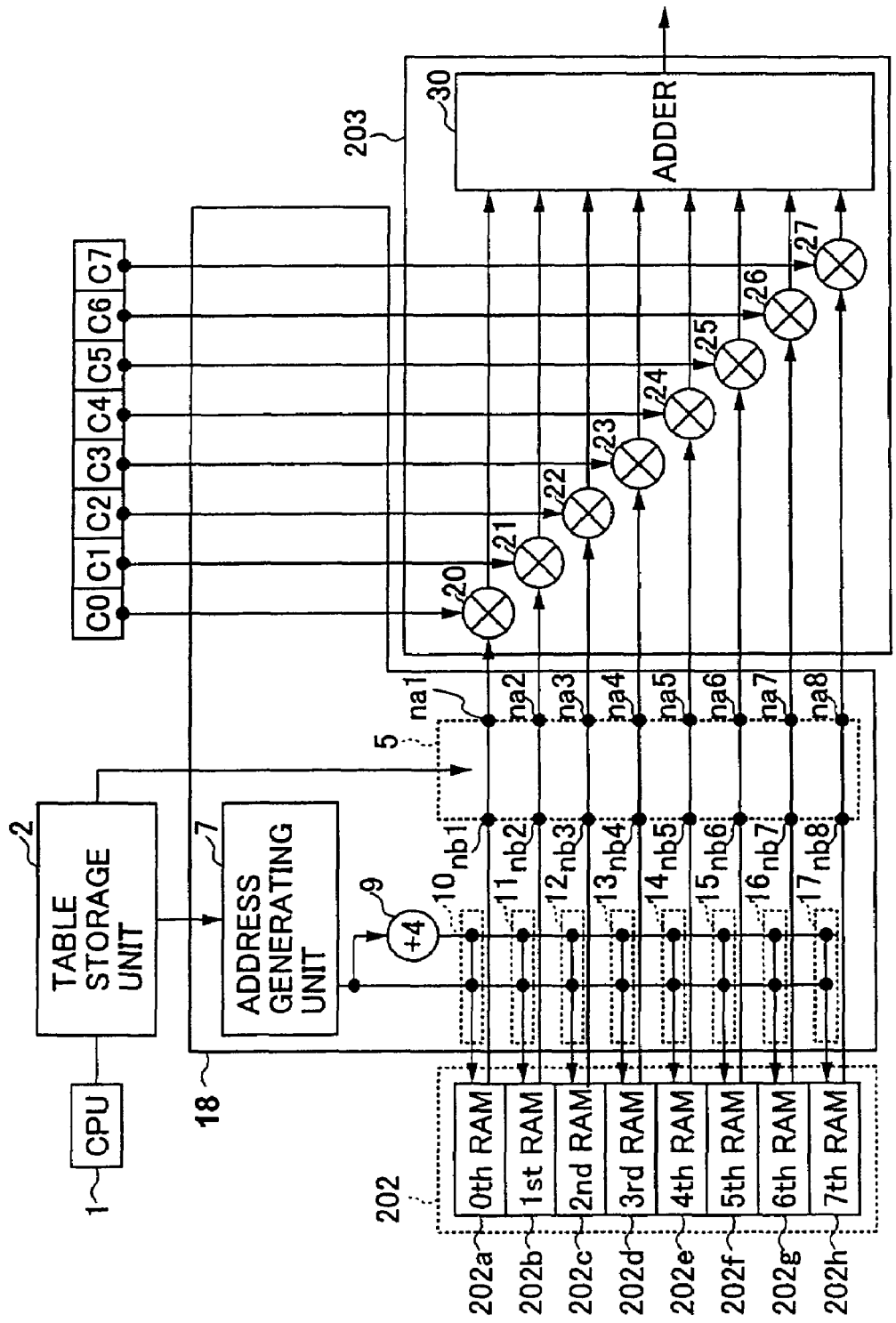
FIG. 9 shows a second example of a read-out control unit in accordance with the present invention.

The operation performed by the read-out control unit 3 shown in FIG. 8 can also be realized by a read-out control unit 18 shown in FIG. 9. The read-out control unit 18 has the same structure as the read-out control unit 3 shown in FIG. 8, except that the barrel shifter 5 is situated between the memory unit 202 and the matched filter 203. In the read-out control unit 18 having such a structure, sampling data read out from the memory unit 202 are supplied to the nodes nb1 to nb8, as shown in FIG. 9. The chips C0 to C7 that constitute the common code are supplied directly to the multipliers 20 to 27.

Next, a read-out operation performed by the read-out control unit 3 shown in FIG. 8 when the CPU 1 designates the starting position number "1" will be described. The shift amount "0" is first supplied from the table storage unit 2 to the barrel shifter 5. The shift amount of the barrel shifter 5 is then set to "0". The node na1 is connected to the node nb1, and the node na2 is connected to the node nb2. Likewise, the rest of the nodes na3 to na8 are connected to the nodes nb3 to nb8, respectively.

Meanwhile, the table storage unit 2 notifies the address generating unit 7 that no offset has occurred, and supplies "1" as the address generating initial value to the address generating unit 7. By doing so, the address "1" is supplied to each of the RAMs 202a to 202h.

Figure 11:
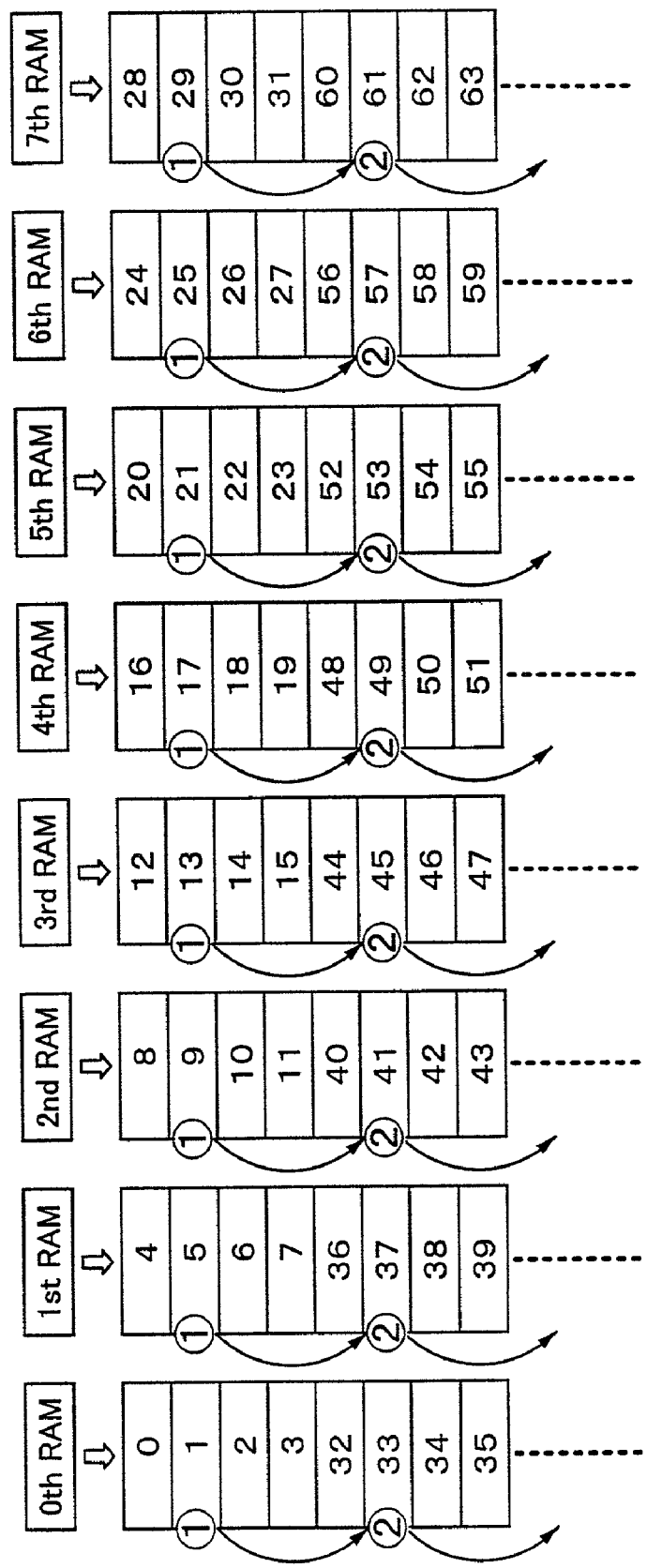
FIG. 11 illustrates another example of the data read-out operation performed by the read-out control unit shown in FIG. 8 or 9.

In this manner, the sampling data having the sampling numbers "1", "5", "9", . . . "29" are read out as the first-time read data in parallel, as shown in FIG. 11, so that the multipliers 20 to 27 acquire correlation with the common code. Likewise, the address "5" generated by the added address generating unit 9 is supplied to each of the RAMs 202a to 202h, so that the sampling data having the sampling numbers "33", "37", . . . "61" are read out from the memory unit 202 in parallel as the second-time read data.

It should be understood that the above operation performed by the read-out control unit 3 shown in FIG. 8 can also be performed by the read-out control unit 18 shown in FIG. 9.

Next, a read-out operation performed by the read-out control unit 3 shown in FIG. 8 when the CPU 1 designates the starting position number "10" will be described. In this case, the shift amount "2" is supplied from the table storage unit 2 to the barrel shifter 5, as shown in Table 1. By doing so, the shift amount of the barrel shifter 5 becomes "2", as shown in FIG. 13. More specifically, the node na1 is connected to the node nb3, and the node na2 is connected to the node nb4. Likewise, the nodes na3 to na6 are connected to the nodes nb5 to nb8, respectively. The node na7 is connected to the node nb2, while the node na8 is connected to the node nb1.

Meanwhile, the table storage unit 2 notifies the address generating unit 7 that the offset location is at the 0th RAM 202a and the 1st RAM 202b, and supplies "2" as the address generating initial value to the address generating unit 7.

Figure 12:
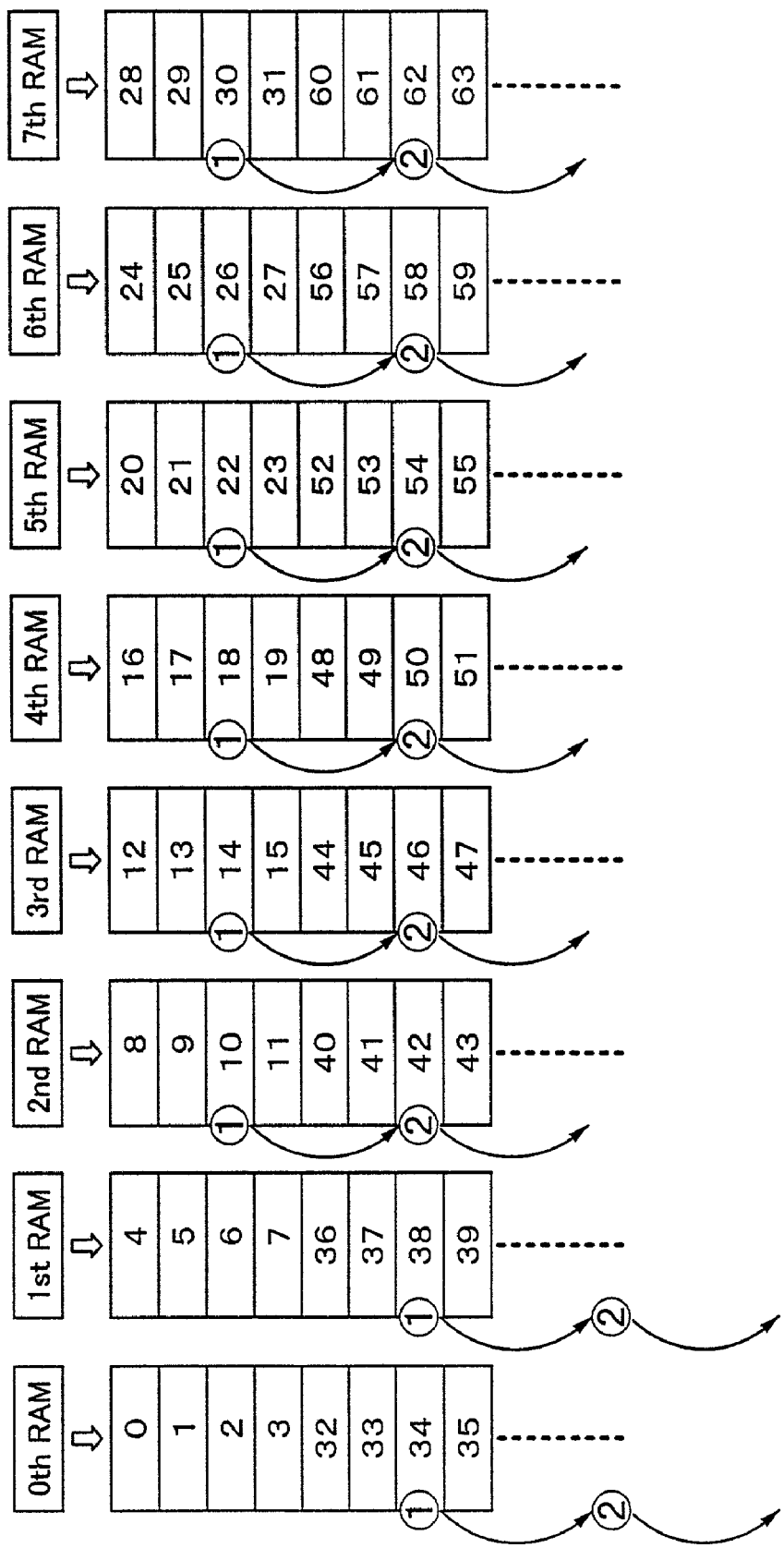
FIG. 12 illustrates yet another example of the data read-out operation performed by the read-out control unit shown in FIG. 8 or 9.

Since the offset location is at the 0th RAM 202a and the 1st RAM 202b, the address "6" generated by the added address generating unit 9 is supplied to the 0th RAM 202a and the 1st RAM 202b. On the other hand, the address "2" is supplied to each of the 2nd RAM 202c to the 7th RAM 202h. By doing so, the sampling data having the sampling numbers "10", "14", "18", . . . , "30", "34", and "38" are read out as the first-time read data from the memory unit 202 in parallel, as shown in FIG. 12. The multipliers 20 to 27 then acquire correlation with the common data. The address "10" generated by the added address generating unit 9 is supplied to the 0th RAM 202a and the 1st RAM 202b. On the other hand, the address "6" is supplied to each of the 2nd RAM 202c to the 7th RAM 202h, so that the sampling data having the sampling numbers "42", "46", . . . "62", . . . are read out as the second-time read data from the memory unit 202 in parallel.

It should be understood that the above operation performed by the read-out control unit 3 shown in FIG. 13 can also be performed by a read-out control unit 18 shown in FIG. 14.

As described so far, the synchronization establishing device 40 of the present invention can acquire parallel correlation by the matched filter 203, thereby facilitating the establishment of synchronization. Particularly, in the second code search in a receiver employing a CDMA system, the high-speed detection of correlation values is advantageous.

In the prior art, the correlation with the spreading code is acquired in the N×M process cycles, as shown in FIGS. 3A and 3B. In the present invention, however, the synchronization establishing device 40 can acquire correlation with the spreading code in the M process cycles. Thus, the frequency of the process cycles can be reduced, and the power consumption can be lowered accordingly.

The present invention is not limited to the specifically disclosed embodiments, but variations and modifications may be made without departing from the scope of the present invention.

The present application is based on Japanese priority application No. 2000-131440, filed on Apr. 28, 2000, the entire contents of which are hereby incorporated by reference.

What is claimed is:

1. A synchronization establishing device that establishes synchronization in a CDMA receiver configured to receive a signal cyclically spread by a common code and spread by an intrinsic code, said device comprising:
    a data storage unit that accumulates reception data corresponding to at least a prescribed number of chips of the common code in respective storage areas; and
    a first correlation value detection unit that reads out the reception data from the storage areas in parallel, and determines a correlation value between the common code and the reception data by multiplying the reception data read out from each of the storage areas by associated one of the chips of the common code in parallel.

2. The synchronization establishing device as claimed in claim 1, further comprising a second correlation value detection unit that establishes correlation between the intrinsic code included in divided chips of a spread code and the first value determined by the first correlation value detection unit to determine the correlation value.

3. The synchronization establishing device as claimed in claim 1, wherein the first correlation value detection unit is a matched filter.

4. A method of establishing synchronization in a CDMA receiver configured to receive a signal cyclically spread by a common code and spread by an intrinsic code, said method comprising the steps of:
    accumulating reception data corresponding to at least a prescribed number of chips of the common code in respective storage areas;
    reading out the accumulated reception data from the storage areas in parallel;
    determining a correlation value between the common code and the reception data by multiplying the reception data read out from each of the storage areas by associated one of the chips of the common code in parallel; and
    correlating the correlation value with the intrinsic code.

5. The method as claimed in claim 4, further comprising the steps of:
    determining a first value by correlating the reception data read in parallel with the common code included in a spread code; and
    establishing correlation between the first value and the intrinsic code to determine the correlation value.

6. A CDMA receiver that receives a signal cyclically spread by a common code and spread by an intrinsic code, said receiver comprising:
    a data storage unit that accumulates reception data corresponding to at least a prescribed number of chips of the common code in respective storage areas;
    a first correlation value detection unit that reads out the reception data from the storage areas in parallel, and determines a correlation value between the common code and reception data by multiplying the reception data read out from each of the storage areas by associated one of the chips of the common code in parallel; and
    a second correlation value detection unit that correlates the correlation value determined by the first correlation value detection unit with the intrinsic code.

7. The receiver as claimed in claim 6, further comprising:
- a second correlation value detection unit that establishes correlation between an intrinsic code and a first value determined by the first correlation value detection unit to produce a synchronized code; and
- a despreading unit that despreads the reception data using the synchronized code supplied from the second correlation value detection unit;
- wherein the first value is determined by correlating the reception data read in parallel with the common code in parallel.

8. A synchronization establishing device that establishes synchronization in a CDMA receiver configured to receive a signal cyclically spread by a common code and spread by an intrinsic code, said device comprising:
- a data storage unit that accumulates reception data corresponding to at least a prescribed number of chips of the common code, in respective sub-units arranged in parallel;
- a read-out control unit that reads out the reception data from the sub-units in parallel, when a sampling start position is given, based on an address generation initial value and an offset location of the sub-units defined by the sampling start position; and
- a correlation value detection unit that determines a correlation value between the common code and the reception data by multiplying the reception data read out from each of the sub-units by associated one of the chips of the common code in parallel.

9. The synchronization establishing device as claimed in claim 8, wherein the read-out control unit includes:
- an address generator that uses the address generation initial value and the offset location to control a readout address of each of the sub-units when the sampling start position is given; and
- a barrel shifter that uses the shift amount to select a common code when the sampling start position is given.

10. The synchronization establishing device as claimed in claim 8, further comprising:
- a table storing the address generation initial value, the offset location, and the shift amount, in association with the sampling start position;
- wherein the address generation initial value, the offset location, and the shift amount are supplied to the read-out control unit when the sampling start position is given.

11. The synchronization establishing device of claim 8, wherein the read-out control unit selects the common code for each of the multiple sub-units based on a shift amount defined by the sampling start position.

12. A method of establishing synchronization in a CDMA receiver configured to receive a signal cyclically spread by a common code and spread by an intrinsic code, said method comprising the steps of:
- accumulating reception data corresponding to at least a prescribed number of chips of the common code, in respective storage areas arranged in parallel;
- reading out the accumulated reception data from the storage areas in parallel, when a sampling start position is given, based on an address generation initial value and an offset location defined by the sampling start position;
- selecting the common code for the reception data stored in each of the storage areas, based on a shift amount defined by the sampling start position; and
- determining a correlation value between the common code and the reception data by multiplying the reception data read out from each of the storage areas by associated one of the chips of the common code in parallel.

13. The method as claimed in claim 12, further comprising the step of:
- storing the address generation initial value, the offset location, and the shift amount, in association with the sampling start position, in advance.

14. A CDMA receiver configured to receive a signal cyclically spread by a common code and spread by an intrinsic code that receives reception data sequences by establishing synchronization based on an obtained correlation value, said receiver comprising:
- a data storage unit that accumulates the reception data corresponding to at least a prescribed number of chips of the common code, in respective sub-units arranged in parallel;
- a read-out control unit that reads out the reception data from the sub-units in parallel, when a sampling start position is given, based on an address generation initial value and an offset location of the sub-units defined by the sampling start position, and that selects a common code for each of the sub-units based on a shift amount defined by the sampling start position; and
- a correlation value detection unit that determines a correlation value between the common code and the reception data by multiplying the reception data read out from each of the sub-units by associated one of the chips of the common code in parallel.

* * * * *